US012250098B2

(12) United States Patent
Sparkman, III et al.

(10) Patent No.: US 12,250,098 B2
(45) Date of Patent: Mar. 11, 2025

(54) SYSTEMS AND METHODS FOR CONTROL CHANNEL TUNNELING

(71) Applicant: Snap One, LLC, Lehi, UT (US)

(72) Inventors: James Loren Sparkman, III, South Jordan, UT (US); Robert Joshua Walker, Fort Mill, SC (US)

(73) Assignee: Snap One, LLC, Lehi, UT (US)

( * ) Notice: Subject to any disclaimer, the term of this patent is extended or adjusted under 35 U.S.C. 154(b) by 0 days.

(21) Appl. No.: 18/378,635

(22) Filed: Oct. 10, 2023

(65) Prior Publication Data

US 2024/0039759 A1 Feb. 1, 2024

Related U.S. Application Data

(63) Continuation of application No. 17/722,090, filed on Apr. 15, 2022, now Pat. No. 11,824,684.

(51) Int. Cl.
*H04L 12/46* (2006.01)
*H04L 9/40* (2022.01)
*H04L 12/66* (2006.01)

(52) U.S. Cl.
CPC .......... *H04L 12/4633* (2013.01); *H04L 12/66* (2013.01); *H04L 63/166* (2013.01); *H04L 63/168* (2013.01)

(58) Field of Classification Search
CPC ................. H04L 12/4633; H04L 12/33; H04L 63/166; H04L 63/168

USPC ......................................................... 709/224
See application file for complete search history.

(56) References Cited

U.S. PATENT DOCUMENTS

| | | | |
|---|---|---|---|
| 10,038,572 B1* | 7/2018 | Seshadri | H04L 45/7452 |
| 11,824,684 B2* | 11/2023 | Sparkman, III | H04L 12/66 |
| 2008/0198858 A1* | 8/2008 | Townsley | H04L 61/2535 |
| | | | 370/392 |
| 2013/0343225 A1* | 12/2013 | Richards | H04L 12/6418 |
| | | | 370/254 |
| 2016/0248761 A1* | 8/2016 | Talvensaari | H04L 63/0838 |
| 2017/0078197 A1* | 3/2017 | Cj | H04L 45/745 |
| 2019/0020723 A1* | 1/2019 | Kumar | H04L 63/029 |
| 2019/0036735 A1* | 1/2019 | Vasudevan | H04L 12/2856 |

* cited by examiner

*Primary Examiner* — David P Zarka
(74) *Attorney, Agent, or Firm* — Greenberg Traurig, LLP; Nicholas Martin; David J. Dykeman (57) ABSTRACT

A method for communicating between a first network and a second network is described. The method includes receiving, by a network device via a persistent control channel established between the network device and a server device connected to a first network, a first message that includes: (1) information indicating a tunneling protocol, and (2) information associated with a first tunneling payload. The persistent control channel is for communicating: (1) messages including control information, and (2) messages including tunneling payloads. The method also includes transmitting, by the network device to an endpoint device connected to a second network, a second message including the information associated with the first tunneling payload.

20 Claims, 8 Drawing Sheets

SYSTEMS AND METHODS FOR CONTROL CHANNEL TUNNELING

TECHNICAL FIELD

The present disclosure relates generally to electronic devices. More specifically, the present disclosure relates to systems and methods for control channel tunneling.

BACKGROUND

Electronic devices have become ubiquitous in modern society. For example, laptop computers, tablets, smart phones, video players, large screen TVs, disc players, audio players, video game consoles, and other consumer electronic items have become more widely available.

The increasing types of electronic components have packed today's homes and businesses with modern conveniences. Typical homes and businesses now include more electronic devices than ever before. For instance, a home or business may include one or more audio/video (AV) devices, security systems, lighting devices, sprinkling systems, cameras, etc.

In some cases, a user may manually control one or more electronic devices to adjust a setting and/or produce a target output. For instance, a user may flip a switch, press a button, and/or turn a knob of an electronic device to turn on a light, adjust volume, play a movie, arm an alarm, etc.

DETAILED DESCRIPTION

A method is described. The method includes receiving, by a network device via a persistent control channel established between the network device and a server device connected to a first network, a first message that includes: (1) information indicating a tunneling protocol, and (2) information associated with a first tunneling payload. The persistent control channel is for communicating: (1) messages including control information, and (2) messages including tunneling payloads. The method also includes transmitting, by the network device to an endpoint device connected to a second network, a second message including the information associated with the first tunneling payload.

The control information may be associated with a first frame type of the persistent control channel and the tunneling protocol may be associated with a second frame type of the persistent control channel. The first frame type may be a TEXT frame type and the second frame type may be a BINARY frame type. The persistent control channel may be a Web Socket channel.

The method may include determining the information associated with the tunneling payload according to removing, by the network device, framing information from the first message. The second message may include information indicating an open channel command.

The first tunneling payload may be carried over a first Secure Sockets Layer or Transport Layer Security (SSL/TLS) connection between a client device and the server device on the first network. The method may further include transmitting, by the network device, information associated with establishing a second SSL/TLS connection with the endpoint device on the second network based on the first message. The persistent control channel may carry the tunneling payload over a TLS connection between the first network and the second network.

The method may include receiving, by the network device, a third message including information associated with a response payload from the endpoint device. The method may also include determining, by the network device, framing information for a fourth message that includes the information associated with the response payload. The method may further include transmitting, by the network device, the fourth message to the server device via the persistent control channel.

The network device may be a switch, router, or automation controller that is linked to a plurality of endpoint devices on the second network. The network device may be the endpoint device.

A network device is also described. The network device includes a processor. The network device also includes memory in electronic communication with the processor. Instructions stored in the memory are executable to receive, via a persistent control channel established between the network device and a server device connected to a first network, a first message that includes: (1) information indicating a tunneling protocol, and (2) information associated with a first tunneling payload. The persistent control channel is for communicating: (1) messages including control information, and (2) messages including tunneling payloads. The instructions stored in the memory are also executable to transmit, to an endpoint device connected to a second network, a second message including the information associated with the first tunneling payload.

A server device is also described. The server device includes a processor. The server device also includes memory in electronic communication with the processor. Instructions stored in the memory are executable to transmit, via a persistent control channel established between a network device and the server device connected to a first network, a first message that includes: (1) information indicating a tunneling protocol, and (2) information associated with a first tunneling payload. The persistent control channel is for communicating: (1) messages including control information, and (2) messages including tunneling payloads. The instructions stored in the memory are also executable to receive, from the network device via the persistent control channel, information associated with a response payload from an endpoint device connected to a second network.

Some examples of the systems and methods described herein may provide mechanisms and/or structures (e.g., protocols) for tunneling network traffic (e.g., arbitrary network traffic, hypertext transfer protocol (HTTP) traffic, Web Socket traffic, a video stream, an audio stream, and/or interface data, etc.) across a control channel for a network device. Some examples of the systems and methods described herein may allow a client device (e.g., computing device, smartphone, tablet device, game console, remote device, etc.) to access an endpoint device inside of a network (e.g., private unexposed network, local area network (LAN), and/or network in a residential or commercial environment, etc.), by leveraging a control channel from a network device at a site. For instance, some of the techniques described herein may provide a smartphone access with fast and reliable remote access to a home automation system from a mobile application, may provide remote configuration capability for a home automation system, and/or may provide remote access to endpoint devices inside of a network.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
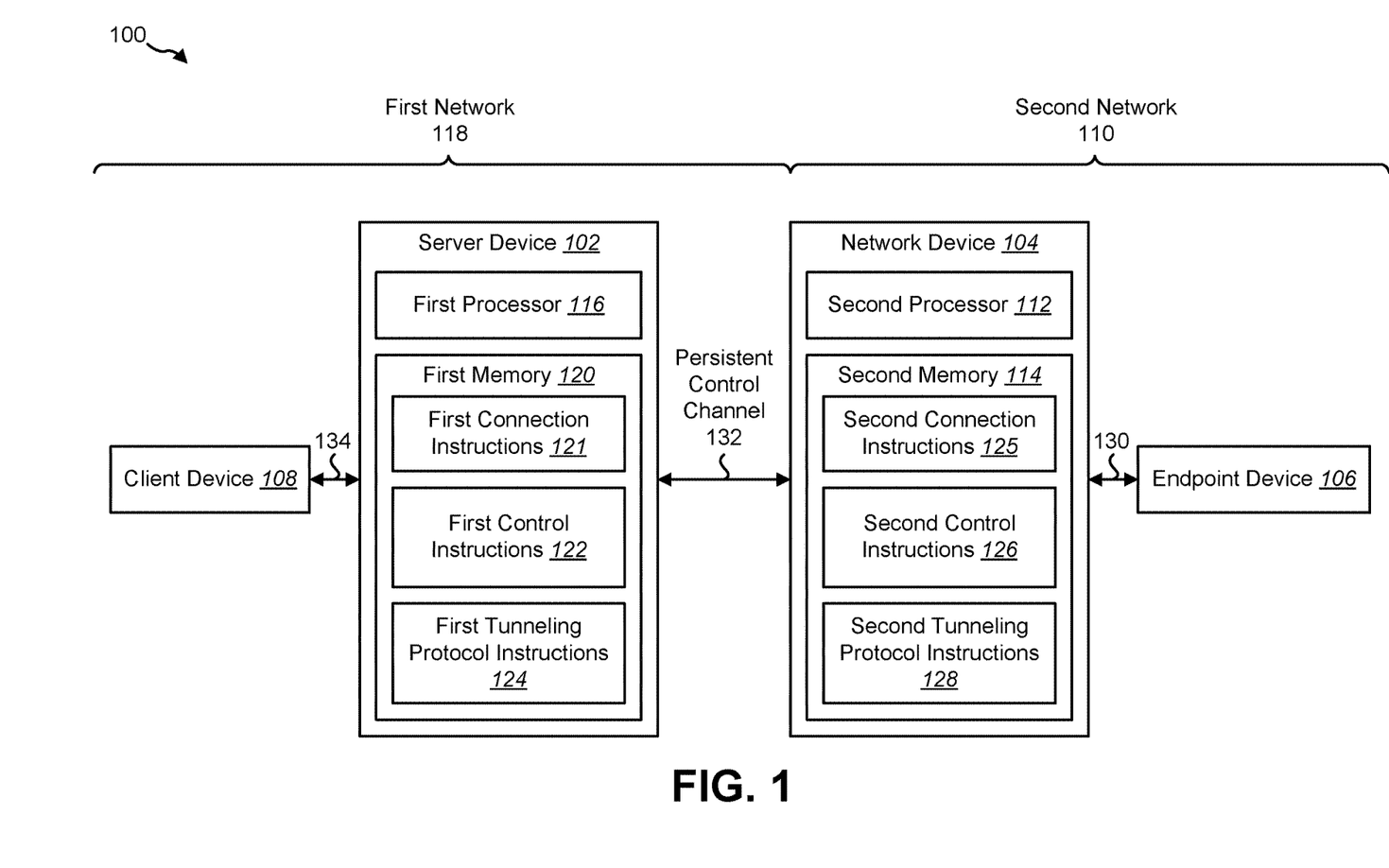
FIG. 1 is a block diagram of a system for control channel tunneling.

FIG. 1 is a block diagram of a system 100 for control channel tunneling. The system 100 may include a first network 118 and/or a second network 110. A network may be a group of devices interconnected by a communication link or links. For instance, groups within a network may communicate using a communication link or links.

In some examples, the first network 118 may be a wide area network (WAN). For instance, the first network 118 may be the Internet. The communication link(s) of the first network 118 may be implemented with one or more wired links and/or wireless links (e.g., communications over metallic wire(s), coaxial cable(s), Ethernet cable(s), fiber optic cable(s), radio frequency (RF) transmission and reception, etc.) with electronic devices. For instance, the first network 118 may include one or more server devices 102, one or more client devices 108, and/or one or more other devices (e.g., router(s), switch(es), hub(s), server(s), etc.). In some examples, a client device 108 may transmit a message to the server 102 and/or may receive a message from the server device 102 via a first connection 134 in the first network 118. In some examples, the first connection 134 may be a non-persistent connection. For instance, the first connection 134 may be a Hypertext Transfer Protocol (HTTP) (e.g., Hypertext Transfer Protocol Secure (HTTPS)) connection.

The server device 102 may include a processor (e.g., first processor 116) and a memory (e.g., first memory 120). The first processor 116 may be logic circuitry to perform operations. For instance, the first processor 116 may execute instructions stored in the first memory 120 to perform one or more operations. Examples of the first processor 116 may include integrated circuitry, a central processing unit (CPU), microprocessor, application-specific integrated circuit (ASIC), field-programmable gate array (FPGA), state machine, a combination thereof, and/or other circuitry, etc.

In some examples, the server device 102 may include a first communication interface (not shown in FIG. 1). The first communication interface may include hardware (e.g., circuitry, socket(s), and/or antenna(s), etc.) and/or instructions to enable communication between the server device 102 and another device or devices (e.g., the network device 104 and/or client device 108). The first communication interface may be a wired and/or wireless interface. For instance, the first communication interface may be an Ethernet interface, coaxial interface (e.g., Data Over Cable Service Interface Specifications (DOCSIS) interface), Universal Serial Bus (USB) interface, Institute of Electrical and Electronics Engineers (IEEE) 802.11 (Wi-Fi) interface, cellular interface (e.g., 3rd Generation Partnership Project (3GPP), Long Term Evolution (LTE), 5G, CDMA2000, etc.), fiber optic interface, or a combination thereof, etc. In some examples, the server device 102 may include multiple communication interfaces. The communication interface(s) may be utilized to transmit and/or receive messages.

The first memory 120 may be a device to electronically store data (e.g., information and/or instructions). Examples of the first memory 120 may include random access memory (RAM), read-only memory (ROM), non-volatile random access memory (NVRAM), synchronous dynamic random-access memory (SDRAM), double data rate SDRAM (DDR SDRAM), programmable read-only memory (PROM), erasable programmable read only memory (EPROM), electrically erasable PROM (EEPROM), flash memory, magnetic or optical data storage, registers, etc. In some examples, the first memory 120 may include (e.g., store) first connection instructions 121, first control instructions 122 and/or first tunneling protocol instructions 124.

In some examples, the one or more server devices 102 may include a public-facing server device or public-facing server devices. A public-facing server device is a server device that is generally accessible (e.g., accessible on a public network). For instance, the server device 102 may be accessible to the client device 108 (e.g., one or more client devices 108) connected to the first network 118 (e.g., the Internet). For instance, a public-facing server device may have a publicly accessible domain name and/or Internet Protocol (IP) address. Examples of a client device 108 may include a desktop computer, laptop computer, tablet device, netbook, cellular phone, smart phone, or personal digital assistant (PDA), etc.

In some examples, multiple server devices may be utilized. For instance, one or more proxy server devices and/or one or more management server devices may be utilized. The proxy server device(s) and/or the management server device(s) may be a public-facing service device(s) (e.g., may be publicly accessible on the Internet). For instance, the proxy server device(s) and/or the management server device(s) may be located in the cloud. As used herein, the term "cloud" may refer to an Internet-based computing network of one or more server devices. For instance, the one or more server devices 102 in the cloud may store, manage, and/or process data (at the request of a client device, such as a personal computer, laptop computer, smartphone, tablet device, local server, etc., for example). In some examples, one or more of the operations described herein in relation to the server device 102 may be distributed across multiple server devices (e.g., proxy server device(s) and/or management server device(s)).

The second network 110 may be implemented in one or more configurations. For example, the second network 110 may be implemented as a local area network (LAN), a wireless LAN (WLAN), a personal area network (PAN), intranet, a combination thereof, or another configuration. Devices within the second network 110 may communicate using wired technologies (e.g., coaxial, Ethernet, fiber optic, etc.), wireless technologies (e.g., microwave, RF (e.g., cellular, Wi-Fi, Bluetooth), infrared, etc.), or a combination thereof. In some examples, the second network 110 may be a private network. For instance, one or more addresses of the one or more network devices 104 and/or of the one or more endpoint devices 106 may not be publicly available and/or publicly accessible. For instance, the one or more endpoint devices 106 may have one or more unpublished IP addresses and/or one or more unpublished media access control (MAC) address(es). In some examples, the second network 110 may be used within a residential home or a business enterprise.

The second network 110 may include one or more network devices 104 and one or more endpoint devices 106. Examples of an endpoint device 106 may include a smart appliance, a light, a lighting system, thermostat, climate control system, a security camera, an alarm system, a smart television, an AV receiver, computing device (e.g., desktop computer, laptop computer, game console, etc.), sprinkling system, garage door opener, electronic lock, etc. In some examples, an endpoint device 106 may transmit a message to the network device 104 and/or may receive a message from the network device 104 via a second connection 130 in the second network 110.

The network device 104 may be an electronic device to control the one or more endpoint devices 106. Examples of a network device 104 may include a network switch, a router, an automation controller (e.g., home automation controller), an Internet of Things (IoT) device, or a combination thereof, etc. For instance, the network device 104 may be a switch, router, or automation controller that is linked to a plurality of endpoint devices on the second network 110. The network device 104 may have a communication link or links to the one or more endpoint devices 106 on the second network 110. The network device 104 may be configured to communicate with the one or more endpoint devices 106 within the second network 110. In some examples, one or more of the operations described herein in relation to the network device 104 may be distributed across multiple network devices.

The network device 104 may include a processor (e.g., second processor 112) and a memory (e.g., second memory 114). The second processor 112 may be logic circuitry to perform operations. For instance, the second processor 112 may execute instructions stored in the second memory 114 to perform one or more operations. Examples of the second processor 112 may include integrated circuitry, a CPU, microprocessor, ASIC, FPGA, state machine, a combination thereof, and/or other circuitry, etc.

In some examples, the network device 104 may include a second communication interface (not shown in FIG. 1). The second communication interface may include hardware (e.g., circuitry, socket(s), and/or antenna(s), etc.) and/or instructions to enable communication between the network device 104 and another device or devices (e.g., the server device 102 and/or endpoint device 106). The second communication interface may be a wired and/or wireless interface. For instance, the second communication interface may be an Ethernet interface, coaxial interface (e.g., DOCSIS interface), USB interface, IEEE 802.11 (Wi-Fi) interface, cellular interface (e.g., 3GPP, LTE, 5G, CDMA2000, etc.), fiber optic interface, or a combination thereof, etc. In some examples, the network device 104 may include multiple communication interfaces. The communication interface(s) may be utilized to transmit and/or receive messages.

The second memory 114 may be a device to electronically store data (e.g., information and/or instructions). Examples of the second memory 114 may include RAM, ROM, NVRAM, SDRAM, DDR SDRAM, PROM, EPROM, EEPROM, flash memory, magnetic or optical data storage, registers, etc. In some examples, the second memory 114 may include (e.g., store) second connection instructions 125, second control instructions 126 and/or second tunneling protocol instructions 128.

In some examples, the network device 104 may initiate the establishment of a persistent control channel 132 with the server device 102 on the first network 118. For example, the second processor 112 may execute the second connection instructions 125 to initiate the establishment of the persistent control channel 132 (e.g., transmit an open connection request to the server device 102). For instance, the network device 104 (e.g., a switch, router, home automation controller, and/or an IoT device, etc.) may make an outbound connection (e.g., Web Socket channel) with the server device 102 (e.g., management server device in the cloud). In some examples, the first processor 116 may execute the first connection instructions 121 to respond to the open connection request sent from the network device 104 (e.g., to negotiate with the network device 104 to open the persistent control channel 132). In some examples, making the outbound connection (e.g., transmitting a message to establish an outbound connection) may avoid a firewall, access control list (ACL), and/or or network address translation (NAT) routing limitation(s) of the second network 110 from preventing (e.g., blocking) connectivity. In some examples, once the outbound call is established, the network device 104 may be managed by the server device 102 over the persistent control channel 132.

In some examples, the persistent control channel 132 may be (and/or may be supported on) a connection that persists indefinitely. For instance, the persistent control channel 132 may be opened initially and/or may not be closed (while Internet access is available, while power is available, and/or while the server device 102 and the network device 104 are functioning, for example). In some examples, the persistent control channel 132 may not be opened and closed with each request and response cycle (e.g., the persistent control channel 132 may not be opened and closed with each transaction as with basic HTTP connections). For instance, the persistent control channel 132 may remain open with or without payload traffic. In some examples, the persistent control channel 132 may not carry connection establishment overhead (e.g., connection opening information, port negotiation information, etc.) of the persistent control channel 132 after the persistent control channel 132 is established. In some examples, the persistent control channel 132 may be a WebSocket channel.

In some examples, the persistent control channel 132 may be used to communicate messages including control information. Control information may be a set of rules and/or a set of instructions (e.g., commands) that the server device 102 may utilize to control the network device 104. For instance, the server device 102 may transmit specific messages (e.g., commands) from the first network 118 that instruct the network device 104 to perform an operation(s). In some examples, the set of instructions may be limited to a defined set of commands corresponding to a defined set of functions that are executable by the network device 104. For instance, the set of instructions may include a set of keywords, where each keyword may instruct the network device 104 to perform a certain function. Examples of functions may include rebooting an endpoint device 106, controlling an endpoint device 106 to activate or deactivate (e.g., turn a light on or off, lock or unlock an electronic lock, etc.), get a status indicator from an endpoint device 106, etc. For instance, the first control instructions 122 may include a limited set of functions that the server device 102 may command the network device 104 to perform. In some examples, the first processor 116 may execute the first control instructions 122 to select and/or transmit a command to the network device 104 for execution.

The network device 104 may transmit one or more responses and/or one or more unsolicited status events back to the server device 102. In some examples, the network device 104 may directly execute a function indicated by a command sent from the server device 102 (without passing the payload of the command and/or without transmitting the command itself to an endpoint device 106, for instance). In some examples, the second control instructions 126 may include a set of functions (e.g., executable instructions) corresponding to the limited set of commands that may be sent by the server device 102. For instance, the network device 104 may receive a command from the server device 102 and the second processor 112 may execute a function (from the second control instructions 126) corresponding to the command (from the set of commands).

In some examples, the persistent control channel 132 may be used for communicating tunneling payloads. A tunneling payload may be information for tunneling through another network and/or another network protocol. For instance, a tunneling payload may be encapsulated, using a tunneling protocol, within one or more frames of another network protocol. For instance, a client device 108 may transmit information indicating a tunneling protocol and/or information associated with a tunneling payload to the server device 102. For instance, the client device 108 may transmit an instruction (e.g., GET), host information (e.g., web address of the server device 102, uniform resource locator (URL) of the server device 102, etc.), agent information (e.g., information identifying a browser utilized on the client device 108), and/or header information (e.g., site identification information, endpoint device identification information, a local IP address (in the second network 110, for instance) of the endpoint device 106, Media Access Control (MAC) address, and/or port information), etc. In some examples, the client device 108 may receive addressing information of one or more endpoint devices from the server device 102 and/or from the network device 104. For instance, the client device 108 may login to the server device 102 and/or network device 104, which may provide the addressing information (e.g., address information internal to the second network 110, local IP address(es), port(s), MAC address(es), etc.) via a login, sign-in, and/or authentication procedure.

The information sent from the client device 108 may be targeted to the endpoint device 106 via the server device 102. The server device 102 may encapsulate the information associated with a tunneling payload in one or more frames for the persistent control channel 132 and/or may transmit the one or more frames to the network device 104 over the persistent control channel 132. For instance, the first processor 116 may execute the first tunneling protocol instructions 124 to produce a first message. The first message may include information indicating a tunneling protocol and/or information associated with a first tunneling payload. For instance, the server device 102 may add framing information to the information received from the client device 108 to produce the first message. For example, the server device 102 may wrap the information from the client device in a frame (e.g., BINARY frame).

In some examples, information indicating a tunneling protocol may be header information and/or a frame type. For instance, a network protocol may allow and/or support different frame types. In some examples, control information may be associated with a first frame type of the persistent control channel 132 and/or the tunneling protocol may be associated with a second frame type of the persistent control channel. For instance, the first frame type may be a TEXT frame type and/or the second frame type may be a BINARY frame type. In some examples, the persistent control channel 132 (e.g., a network protocol of the persistent control channel 132, WebSocket, etc.) may support only a TEXT frame type and a BINARY frame type for data frames. In some examples, the persistent control channel 132 may support one or more other frame types for control frames. For instance, the Internet Engineering Task Force (IETF) Request for Comments (RFC) 6455 may support only a TEXT frame type and a BINARY frame type for data frames, while supporting "Ping," "Pong," and "Close" frame types for control frames. In some examples, the network device 104 may detect a tunneling protocol and/or a tunneling payload based on a received frame type. For instance, if a received frame type is a second frame type (e.g., BINARY frame type), the network device 104 may detect that the received frame includes information associated with a tunneling payload. In some examples, if a received frame type is a first frame type (e.g., TEXT frame type), the network device 104 may detect that the received frame includes control information.

In some examples, information indicating a tunnel protocol may be header information. For instance, a frame (e.g., BINARY frame) may include header information indicating a local IP address (e.g., an IP address that is local to the second network 110, an IP address of an endpoint device 106, etc.), local port information (e.g., a port indicator corresponding an endpoint device 106), and/or other information indicating the tunneling protocol. In some examples, the network device 104 may detect a tunneling protocol and/or a tunneling payload based on the header information.

In some examples, the network device 104 may receive, via the persistent control channel 132 established between the network device 104 and the server device 102 connected to the first network 118, a first message. The first message may include information indicating a tunneling protocol and/or information associated with a first tunneling payload. In some examples, the network device 104 may determine the information associated with the tunneling payload according to removing framing information from the first message.

The network device 104 may transmit, to the endpoint device 106 connected to the second network 110, a second message including the information associated with the first tunneling payload. For example, the network device 104 may remove (e.g., strip) the framing information from the first message to produce the second message. In some examples, the network device 104 may modify (e.g., generate, edit, and/or reformat) header information to produce the second message. The network device 104 may transmit the second message to the endpoint device 106 via the second network 110. In some examples, the tunneling protocol may enable a message (e.g., tunneling payload) sent from the client device 108 via the first network 118 to be received by the endpoint device 106 as if the client device 108 were included in the second network 110, though the client device 108 is not actually included in the second network 110.

In some examples, the network device 104 itself may be an endpoint device. For instance, the network device 104 may loop the second message to itself. In some examples, the network device 104 may serve to route a tunneled payload to itself (after the framing is removed from the first message, for instance). In some examples, looping the second message (e.g., looping or "transmitting" the second message from the network device 104 to the network device 104) may include providing (e.g., sending) the second message (e.g., deframed packet, first message after removing the framing information, etc.) to a communication interface with a loopback address. For instance, the deframed packet may be provided to the second communication interface (similar to another communication to another endpoint device 106, for example, but addressed to a loopback address (e.g., 127.0.0.1 for an IP network)).

In some examples, the second message includes information indicating an open channel command. For instance, the information associated with the tunneling payload (e.g., data of the tunneling payload) may be sent with an open channel command to the endpoint device 106. In some approaches, an open channel command is sent separately from payload data. Transmitting the information associated with the tunneling payload together with the open channel command may enable payload data to be received at the endpoint device 106 concurrently with the open channel command (e.g., may enable payload data to be received before channel opening procedures are complete), which may expedite data communications (e.g., may reduce communication latency). For example, transmitting the open channel command with the information associated with the tunneling payload may front load the open channel command.

In some examples, the first tunneling payload is carried over a Secure Sockets Layer or Transport Layer Security (SSL/TLS) connection between a client device 108 and the server device 102 on the first network 118. For instance, the first connection 134 may be an SSL/TLS connection between the client device 108 and the server device 102. For example, the client device 108 and/or the server device 102 may establish an SSL/TLS connection that terminates at the client device 108 and/or at server device 102.

In some examples, the persistent control channel 132 may carry the tunneling payload over a TLS connection on the first network 118 (or between the first network 118 and the second network 110, for example). For instance, the persistent control channel 132 may be a TLS connection and/or may be carried on a TLS connection. For example, the server device 102 and the network device 104 may establish a TLS connection that terminates at the server device 102 and/or at the network device 104. The tunneling payload may be carried over the TLS connection.

In some examples, the network device 104 may transmit information associated with establishing an SSL/TLS connection with the endpoint device 106 on the second network 110 based on the first message. In some examples, the tunneling protocol may support one or more open indicators (e.g., codes to establish a connection with or without encryption). For instance, the tunneling protocol may support OPEN and OPEN SECURE codes, which may direct the network device 104 on how to contact an endpoint device 106 (where OPEN SECURE may direct the network device 104 to establish an SSL/TLS connection with an endpoint device 106, for instance). For example, the network device 104 and/or the endpoint device 106 may establish an SSL/TLS connection that terminates at the network device 104 and/or at endpoint device 106 (e.g., the second connection 130 may be an SSL/TLS connection). The tunneling payload may be sent over the SSL/TLS connection in some examples. In some examples, the tunneling payload may be carried over multiple different SSL/TLS connections. For instance, the tunneling payload may be carried over a first SSL/TLS connection between the client device 108 and the server device 102 (in the first network 118), over a second SSL/TLS connection between the server device 102 and the network device 104 (in the first network 118), and/or over a third SSL/TLS connection between the network device 104 and the endpoint device 106 (in the second network 110). In some examples, the tunneling payload may not be carried over only a single SSL/TLS connection between the client device 108 and the endpoint device 106, as the tunneling may trigger detection of a security risk (e.g., man-in-the-middle attack) for some agents (e.g., browsers).

The endpoint device 106 may receive the second message. In some examples, the endpoint device 106 may generate a response to the second message. For instance, the endpoint device 106 may generate and/or transmit a third message to the network device 104. In some examples, the third message may include information associated with a response payload. A response payload may be information and/or data produced in response to a message (e.g., tunneled payload). For instance, the information associated with the response payload may include HyperText Markup Language (HTML) information, Extensible Markup Language (XML) information, a web page, a web application, user interface, video data, textual data, image data, object data, and/or other information in response to the second message (e.g., in response to the tunneling payload).

In some examples, the network device 104 may receive a third message including information associated with a response payload from the endpoint device 106. The network device 104 may determine framing information for a fourth message that includes the information associated with the response payload. For example, the second processor 112 may execute the second tunneling protocol instructions 128 to determine the framing information for the fourth message. In some examples, the framing information may indicate the client device 108 (e.g., an IP address, port number, etc., of the client device 108). The network device 104 may transmit the fourth message to the server device 102 via the persistent control channel 132.

In some examples, the server device 102 may remove (e.g., strip) framing information from the fourth message to produce a fifth message. The fifth message may include the response payload. The server device 102 may transmit the fifth message to the client device 108. In some examples, an application executed on the client device may interpret and/or utilize the response payload. In an example, the client device 108 may render a web interface from the endpoint device 106 in a browser. In another example, the client device 108 may display video from the endpoint device 106 (e.g., a security camera). In some examples, additional messages may be sent and/or received between the client device 108 and the endpoint device 106. For instance, the client device 108 may receive an input (e.g., mouse click, tap on a touchscreen, etc.) that modifies a control on a web interface of the endpoint device 106. The modification may be indicated in a tunneled payload via the server device 102, persistent control channel 132, and network device 104 to the endpoint device 106, which may execute and/or respond to the modification.

Figure 2:
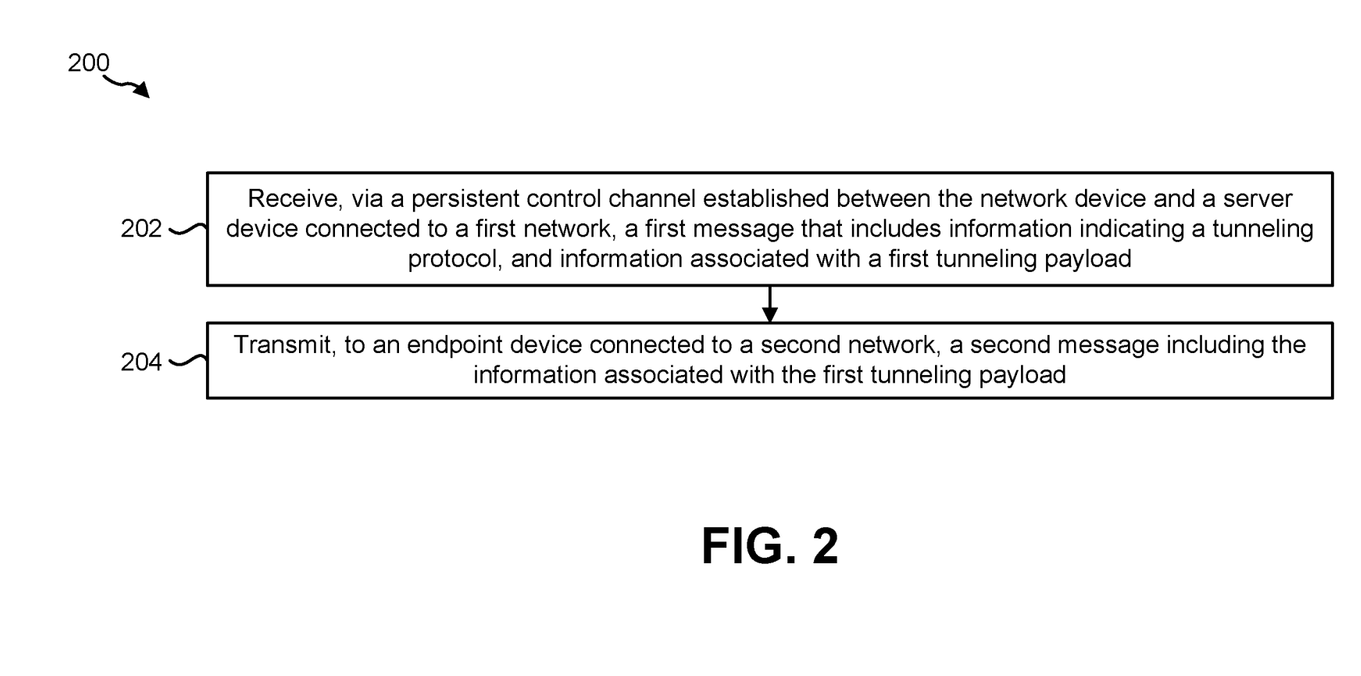
FIG. 2 is a flow diagram illustrating one configuration of a method for control channel tunneling.

FIG. 2 is a flow diagram illustrating one configuration of a method 200 for control channel tunneling. In some examples, the method 200 may be performed by the network device 104 described in relation to FIG. 1 or another network device.

A network device may receive 202, via a persistent control channel established between the network device and a server device connected to a first network, a first message that includes information indicating a tunneling protocol, and information associated with a first tunneling payload. For example, receiving 202 the first message including information indicating a tunneling protocol and information associated with a first tunneling payload may be performed as described in relation to FIG. 1.

The network device may transmit 204, to an endpoint device connected to a second network, a second message including the information associated with the first tunneling payload. In some examples, transmitting 204 the second message including the information associated with the first tunneling payload may be performed as described in relation to FIG. 1. For instance, the network device may remove framing information from the first message to produce the second message and may transmit the second message to the endpoint device via the second network. In some examples, the framing information may indicate internal addressing information (e.g., an IP address) of the endpoint device in the second network.

In some examples, the method 200 may include one or more of the operations and/or procedures described in relation to FIG. 1. For instance, the network device may determine that the first message corresponds to a tunneling protocol based on a frame type (e.g., BINARY frame type). In some approaches, the network device may front load an open channel command with the information associated with the tunneling payload and/or may transmit the open channel command to the endpoint device. In some approaches, the network device may receive the first message via a TLS connection of the persistent control channel and may transmit the second message via another SSL/TLS connection in the second network. In some examples, the network device may loop the second message back to itself (when the tunneled payload is directed to the network device as an endpoint device, for instance).

Figure 3:
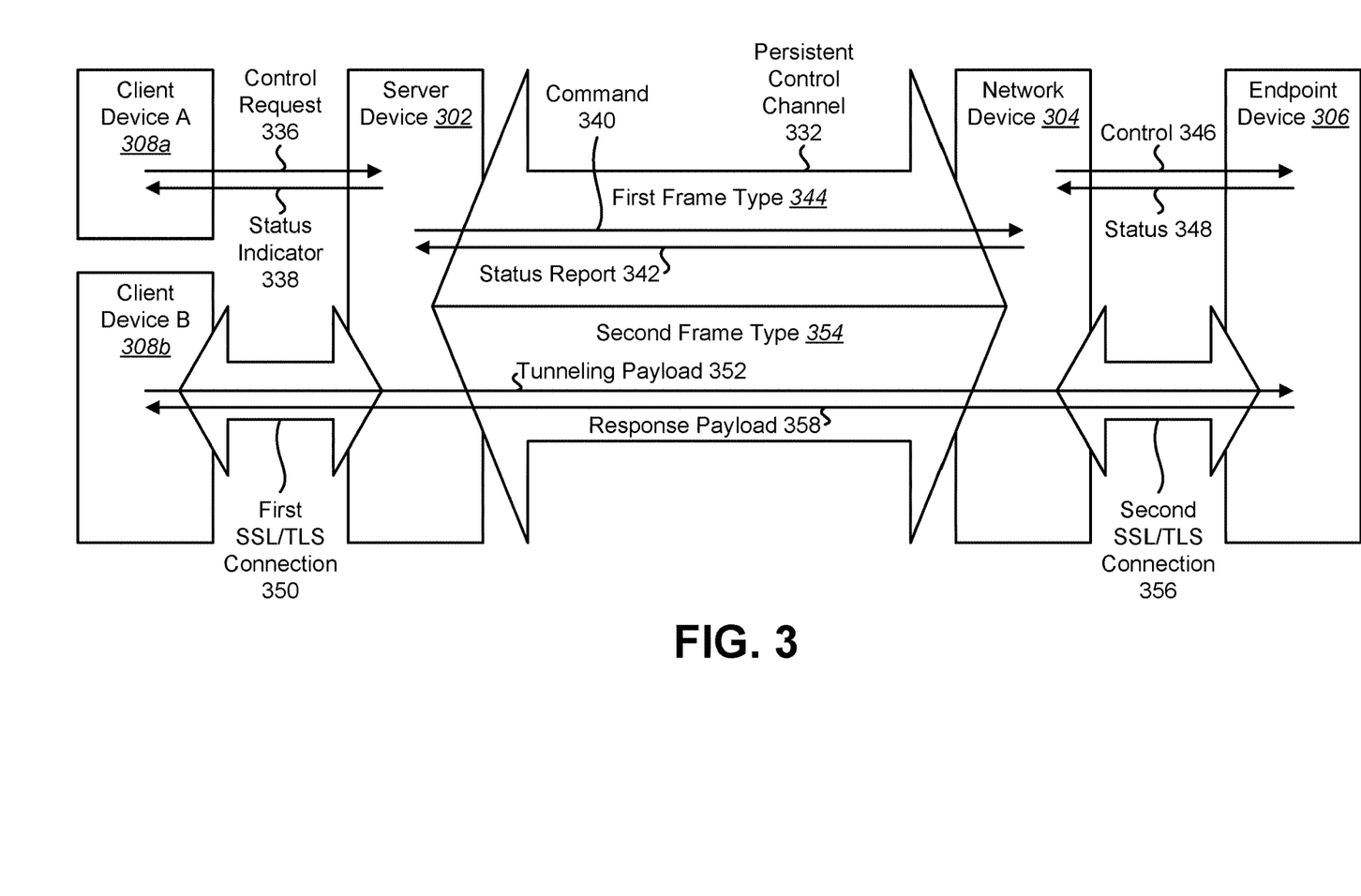
FIG. 3 is a diagram illustrating an example of tunneling over a persistent control channel.

FIG. 3 is a diagram illustrating an example of tunneling over a persistent control channel 332. Specifically, FIG. 3 illustrates client device A 308a, client device B 308b, a server device 302, a network device 304, an endpoint device 306, and a persistent control channel 332. In some examples, client device A 308a, client device B 308b, the server device 302, the network device 304, the endpoint device 306, and/or the persistent control channel 332 may be examples of respective elements described in relation to FIG. 1.

The persistent control channel 332 may be established between the server device 302 and the network device 304. The persistent control channel 332 may carry a first frame type 344 (e.g., a TEXT frame type) and a second frame type 354 (e.g., a BINARY frame type). The first frame type 344 may carry control information and/or the second frame type 354 may carry tunneling information. In some examples, tunneling information may not be carried by the first frame type 344 and/or control information may not be carried by the second frame type 354. In some examples, the persistent control channel 332 may not be a virtual private network (VPN) connection. In some examples, the persistent control channel 332 may be connected over the Internet. In some approaches, if a device (e.g., a client device) connects a network (e.g., first site) via a VPN to a second network (e.g., second site), information (e.g., information for a control channel) may travel via VPN to the second network, but then may connect to the server 302 via the Internet. In some examples, a device (e.g., a client device) may not be allowed to VPN to the same network as the server device 302.

In the example illustrated in FIG. 3, client device A 308a transmits a control request 336 to the server device 302. In response to the control request 336, the server device 302 may generate and transmit a command 340 to the network device 304 using the first frame type 344 on the persistent control channel 332. In response to receiving the command 340, the network device 304 may control 346 the endpoint device 306. For instance, the network device 304 may execute a function indicated by the command 340. For instance, the control 346 may be a code to modify the functioning of the endpoint device 306. The endpoint device 306 may respond to the control 346. For instance, the endpoint device 306 may perform an operation (e.g., activate, deactivate, change a thermostat setting, reboot, etc.).

The endpoint device 306 may report a status 348 to the network device 304. The status 348 may indicate a result of the operation and/or may indicate a current status of the endpoint device 306. In response to the status 348, the network device 304 may generate a status report 342 and transmit the status report 342 to the server device 302. The status report 342 may indicate a result in response to the command 340. For instance, the status report 342 may indicate whether the command 340 was completed successfully (e.g., reboot complete) and/or a resulting state of the endpoint device 306 (e.g., power on, etc.).

In response to receiving the status report 342, the server device 302 may transmit a status indicator 338 to client device A 308a. The status indicator 338 may indicate whether the control request 336 was fulfilled (e.g., reboot complete) and/or a resulting state of the endpoint device 306 (e.g., power on, etc.).

In the example illustrated in FIG. 3, client device B 308b transmits a tunneling payload 352 to the server device 302. For instance, the tunneling payload 352 may be sent to the server device 302 (at the web address of the server device 302, for example) with local addressing information for the endpoint device 306. In some examples, the tunneling payload 352 may be sent over a first SSL/TLS connection 350 between client device B 308b and the server device 302. In response to receiving the tunneling payload 352, the server device 302 may add framing information to the tunneling payload 352 and may transmit the tunneling payload 352 on the persistent control channel 332 using the second frame type 354.

In response to receiving the tunneling payload 352, the network device 304 may remove the framing information and transmit the tunneling payload 352 to the endpoint device 306 using the local addressing information. For instance, the network device 304 may transmit the tunneling payload 352 with a header (e.g., modified header). The endpoint device 306 may respond to the tunneling payload 352. For instance, the tunneling payload 352 may include a GET instruction. The endpoint device 306 may respond with a response payload 358. For instance, the endpoint device 306 may send a web interface, video data, and/or other information to the network device 304 as the response payload 358. In some examples, the tunneling payload 352 and/or the response payload 358 may be sent over a second SSL/TLS connection 356 between the network device 304 and the endpoint device 306.

In response to receiving the response payload 358, the network device 304 may add framing information to the response payload 358 and may transmit the response payload 358 on the persistent control channel 332 using the second frame type 354. In response to receiving the response payload 358, the server device 302 may remove the framing information and transmit the response payload 358 to client device B 308b. Client device B 308b may utilize the response payload 358. For instance, client device B 308b may display a web interface from the endpoint device 306, may display video from the endpoint device 306, may display a webpage from the endpoint device 306, may display programmatic objects from the endpoint device 306, and/or may provide other information from the endpoint device 306. In some examples, a tunneling protocol described herein may enable tunneling a Web Socket (e.g., Web Socket traffic) within another Web Socket (e.g., the persistent control channel 332).

In some examples, the persistent control channel 332 may carry control information (e.g., a command 340 and/or status report 342 with the first frame type 344) transparently and/or concurrently with tunneling information (e.g., a tunneling payload 352 and/or response payload 358 with the second frame type 354). In some examples, the control information (e.g., first frame type 344) may be exclusively used by one or more service provider devices and payload information (e.g., second frame type 354) may be exclusively used by one or more consumer devices. For instance, client device A 308*a* may be a service provider device (e.g., a device owned and/or operated by a service provider that installed and/or maintains the network device 304 and/or endpoint device 306). In some examples, client device B 308*b* may be a consumer device (e.g., a device owned and/or operated by a consumer that uses the network device 304 and/or endpoint device 306).

Figure 4:
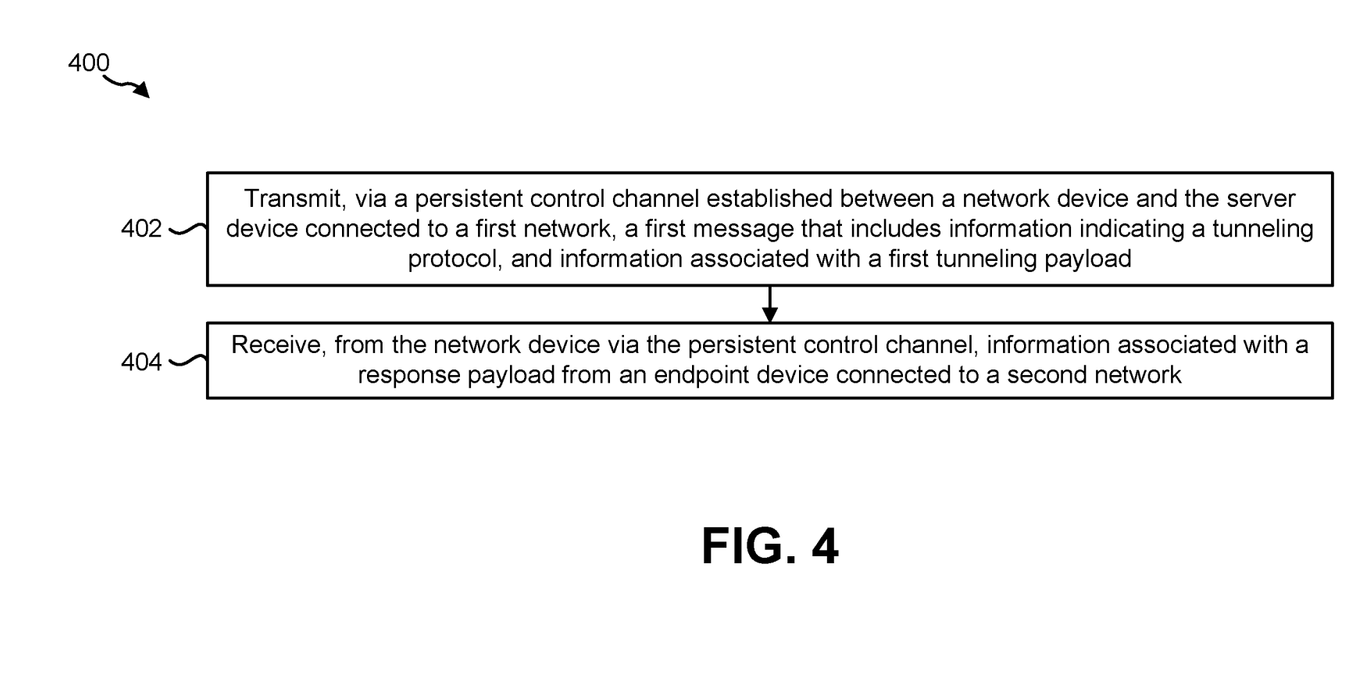
FIG. 4 is a flow diagram illustrating one configuration of a method for control channel tunneling.

FIG. 4 is a flow diagram illustrating one configuration of a method 400 for control channel tunneling. In some examples, the method 400 may be performed by the server device 102 described in relation to FIG. 1 or another server device.

A server device may transmit 402, via a persistent control channel established between a network device and the server device connected to a first network, a first message that includes information indicating a tunneling protocol, and information associated with a first tunneling payload. For example, transmitting 402 the first message including information indicating a tunneling protocol and information associated with a first tunneling payload may be performed as described in relation to FIG. 1.

The server device may receive 404, from the network device via the persistent control channel, information associated with a response payload from an endpoint device connected to a second network. In some examples, receiving 404 the information associated with the response payload may be performed as described in relation to FIG. 1. In some examples, the server device may remove framing information from the response payload to produce a message and may transmit the message to a client device via the first network.

Figure 5:
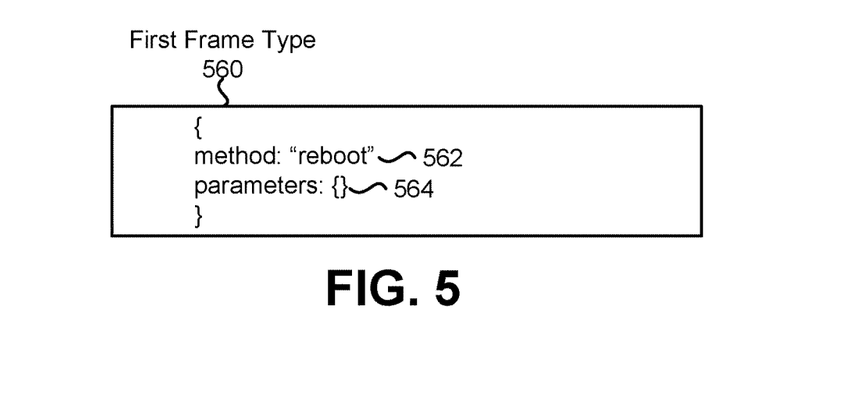
FIG. 5 is a diagram illustrating an example of a first frame type.

FIG. 5 is a diagram illustrating an example of a first frame type 560. The first frame type 560 may be an example of the first frame type described in relation to FIG. 1 and/or of the first frame type 344 described in relation to FIG. 3. For instance, the first frame type 560 may be a TEXT frame of a WebSocket connection. In some examples, the first frame type 560 may include and/or carry control information. For instance, the first frame type 560 may indicate a command 562 and/or one or more parameters 564 (if any). The command 562 may indicate a function to be performed by a network device. In the example of FIG. 5, the command 562 is a reboot command. The network device may perform a reboot function on an endpoint device. For instance, the network device may send a reboot control message to an endpoint device, which may reboot in response to the reboot control message. In some examples, one or more parameters 564 may indicate one or more values that may be utilized (by the network device and/or the endpoint device, for instance) to perform the function.

Figure 6:
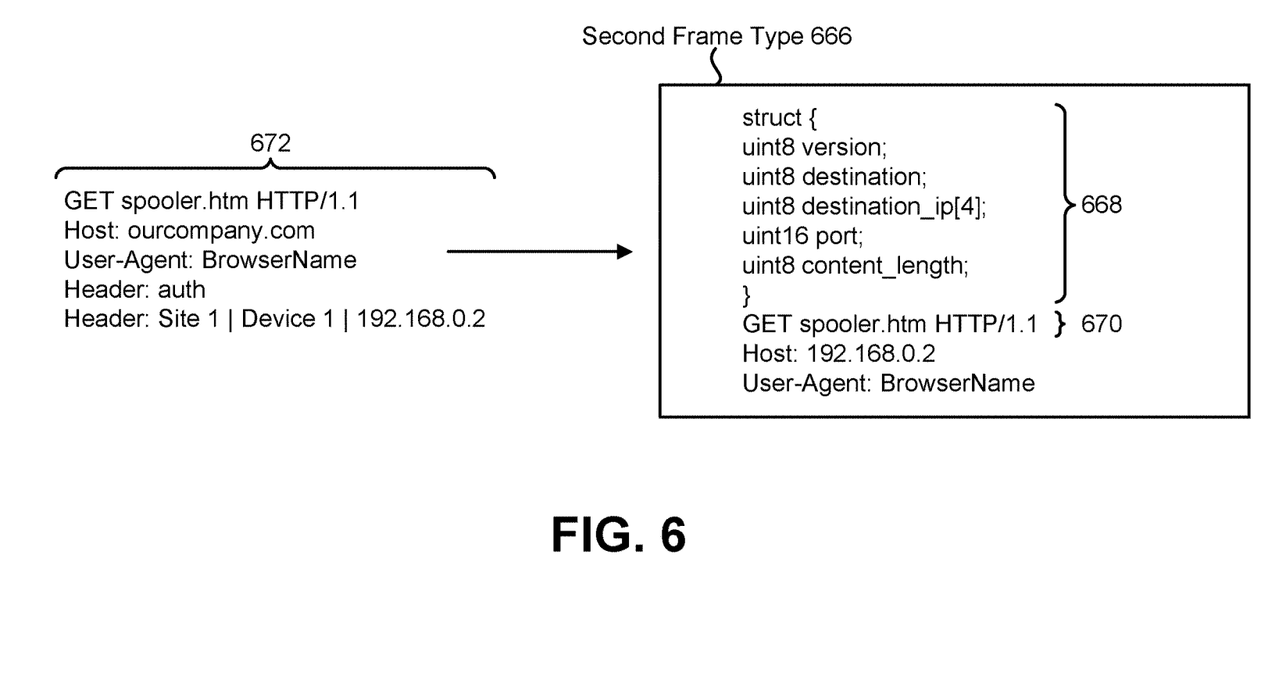
FIG. 6 is a diagram illustrating an example of a second frame type.

FIG. 6 is a diagram illustrating an example of a second frame type 666. The second frame type 666 may be an example of the second frame type described in relation to FIG. 1 and/or of the second frame type 354 described in relation to FIG. 3. For instance, the second frame type 666 may be a BINARY frame of a Web Socket connection. In some examples, a client device may send a message 672 to a server device. In the example of FIG. 6, the message 672 includes information indicating a tunneling protocol and information associated with a tunneling payload. For instance, the message 672 includes a header that indicates "Site 1," "Device 1," and "192.168.0.2," which may indicate a tunneling protocol. For example, "Site 1" may indicate a site where an endpoint device ("Device 1") is located with a local IP address of "192.168.0.2." The message 672 also includes an instruction 670 ("GET spooler.htm HTTP/1.1"), which may be an example of information associated with a tunneling payload.

The server device may generate the second frame type 666 based on the message 672. For example, the server device may add framing information 668 (e.g., frame header information) to generate the second frame type 666. In this example, the framing information 668 includes version information, destination information, an IP address, a port indicator, and content length information. In this example, the information associated with a tunneling payload may include the instruction ("GET spooler.htm HTTP/1.1"), which may instruct a printer to return spooler information.

Figure 7:
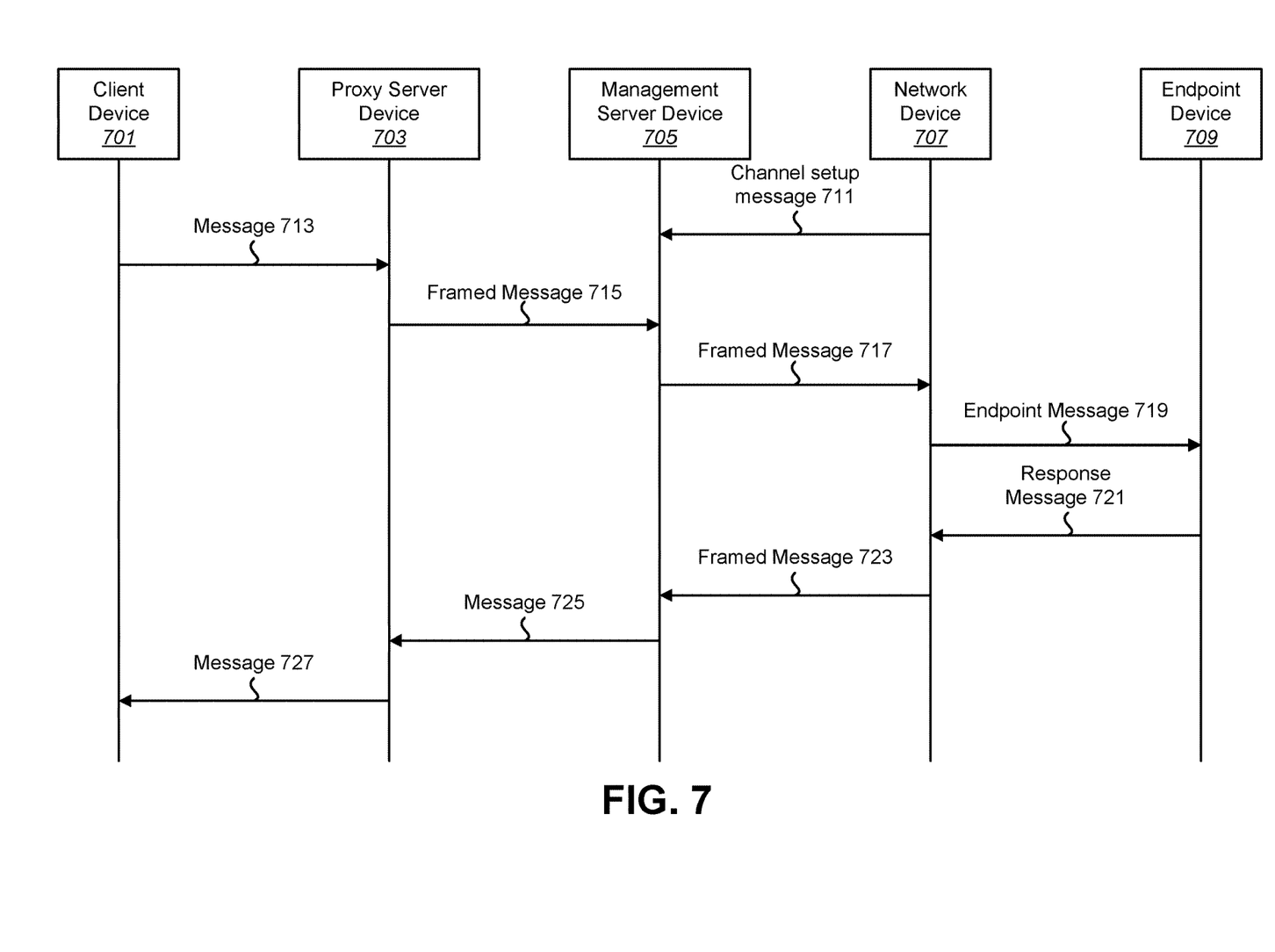
FIG. 7 is a thread diagram illustrating an example of control channel tunneling in accordance with some examples of the systems and methods described herein.

FIG. 7 is a thread diagram illustrating an example of control channel tunneling in accordance with some examples of the systems and methods described herein. FIG. 7 illustrates an example of a client device 701, a proxy server device 703, a management server device 705, a network device 707, and an endpoint device 709. The client device 701 may be an example of one or more of the client devices (e.g., client device 108, client device 308*b*, etc.) described herein. The proxy server device 703 and/or the management server device 705 may be examples of one or more of the server devices (e.g., serve device 102, server device 302, etc.) described herein. For instance, some of the server device functions described herein may be performed by the proxy server device 703 and/or the management server device 705. In some examples, a proxy server and a management server may be included in a single server device. The network device 707 may be an example of one or more of the network devices (e.g., network device 104, network device 304, etc.) described herein. The endpoint device 709 may be an example of one or more of the endpoint devices (e.g., endpoint device 106, endpoint device 306, etc.) described herein.

The network device 707 may send a channel setup message 711 to the management server device 705. For instance, network device 707 may make an outbound connection (e.g., a WebSocket) to the management server device 705 server in the cloud, thus preventing any firewall, ACL, or NAT routing limitations of the destination network from preventing connectivity. Once the outbound call is established, the network device 707 may be managed over a persistent control channel, where specific messages from the cloud may command the network device to perform a function(s) and/or the network device 707 sends responses and unsolicited status events back to the cloud.

The client device 701 may send a message 713 to the proxy server device 703. For instance, the client device 701 may access the proxy server device 703 in the cloud. The message 713 may indicate a specific endpoint device 709 (e.g., IP address and network port combination) inside of the network of the network device 707. The proxy server device 703 may route the packet(s) to the management server device 705 (or route the packet(s) internally to a management server, for instance). The proxy server device 703 may frame the packets with tunneling protocol information to produce a framed message 715, which may be transmitted to the management server device 705. The management server device 705 may forward the framed message 717 across the persistent control channel to the network device 707.

The network device 707 may use the tunneling protocol information to inform routing to the target endpoint device 709. For instance, the network device 707 may strip the framing, and forward the tunneling payload to the endpoint device 709 in an endpoint message 719. The network device 707 may monitor for any return traffic from the endpoint device 709. For instance, the network device 707 may receive a response message 721 and reverse the procedure by framing the packets to produce a framed message 723 that is sent to the management server device 705. The management server device 705 may strip the framing to produce a message 725 (e.g., packets). The message 727 (e.g., packets) may be routed back to the client device 701 via the proxy server device 703.

By leveraging the persistent control channel as a tunnel medium, some examples of the systems and methods described herein may securely provide remote access to network endpoint devices with full end-to-end encryption, with role based access control (RBAC), with reduced overhead, and/or without additional connections from a private network to the public Internet. Some examples of the systems and methods described herein may provide for a remote device (e.g., client device) to access network endpoints in the form of web-based user interfaces (e.g., access a printer's configuration page), application programming interfaces (APIs) (either local to a network device itself such as loopback or within a local area network, for instance), and/or non-IP network mediums such as internal UNIX domain sockets. Some examples of the techniques described herein may allow for a remote client device and/or a remote cloud-based system to access endpoint devices in a private network (e.g., LAN).

Some examples of the tunneling protocol may work in conjunction with (and/or without interference to) existing protocol information on the control channel. Some examples of the systems and methods described herein may allow for concurrent multiplexing of isolated channels of communication within a control channel, such that multiple remote devices may access distinct network endpoints at the same time, while a control protocol remains useable.

Some examples of the techniques described herein may be utilized instead of other tunneling approaches that utilize a separate connection from a control channel. Some other tunneling approaches utilize a negotiation and new connection establishment out-of-band as well as utilizing separate software and infrastructure to work. These out-of-band solutions may be difficult to integrate, may consume more overhead, and/or may not provide a means of monitoring the connection or the connection's health from the perspective of an IoT application.

Some examples of the techniques described herein may utilize a Web Socket connection from a network device to a cloud-based server device. A control protocol may run across TEXT frames, while the tunneling protocol may run across BINARY frames of the Web Socket connection. Some examples of the tunneling protocol provides one or more operations to:
1. OPEN a channel of communication to a network endpoint (with data);
2. OPEN a channel of communication to a network endpoint that uses SSL/TLS negotiation;
3. SEND data across an existing channel;
4. RECEIVE data across an existing channel; and/or
5. CLOSE an existing channel.

An OPEN operation may allow data to be loaded into the initial communication, which reduces transactional overhead and/or amplifies speed (as a proxy server may already identify what the initial SEND operation will be, for example).

In some examples, the server device (e.g., proxy server) is protocol aware. This allows the server device to implement authentication and security controls and/or alter traffic. The server device may alter traffic between itself and a client device, or between itself and an endpoint device. This may allow for HTTP headers to be manipulated, content encoding to be changed, and other changes to be made that may improve experience and/or efficiency. For instance, the server device may add compression to content or decode content that a client device may not be able to handle.

In some examples, heuristics may be utilized to determine packet sizes at various stages to improve network efficiency of the tunnel. In some examples, the chain of devices supports end-to-end encryption. For instance, a proxy server may terminate SSL/TLS between the proxy server and a client device. A management server device and a network device may be connected by a Web Socket over TLS. In this way, traffic between the network device and an endpoint device may not be transmitted over the Internet unencrypted.

Figure 8:
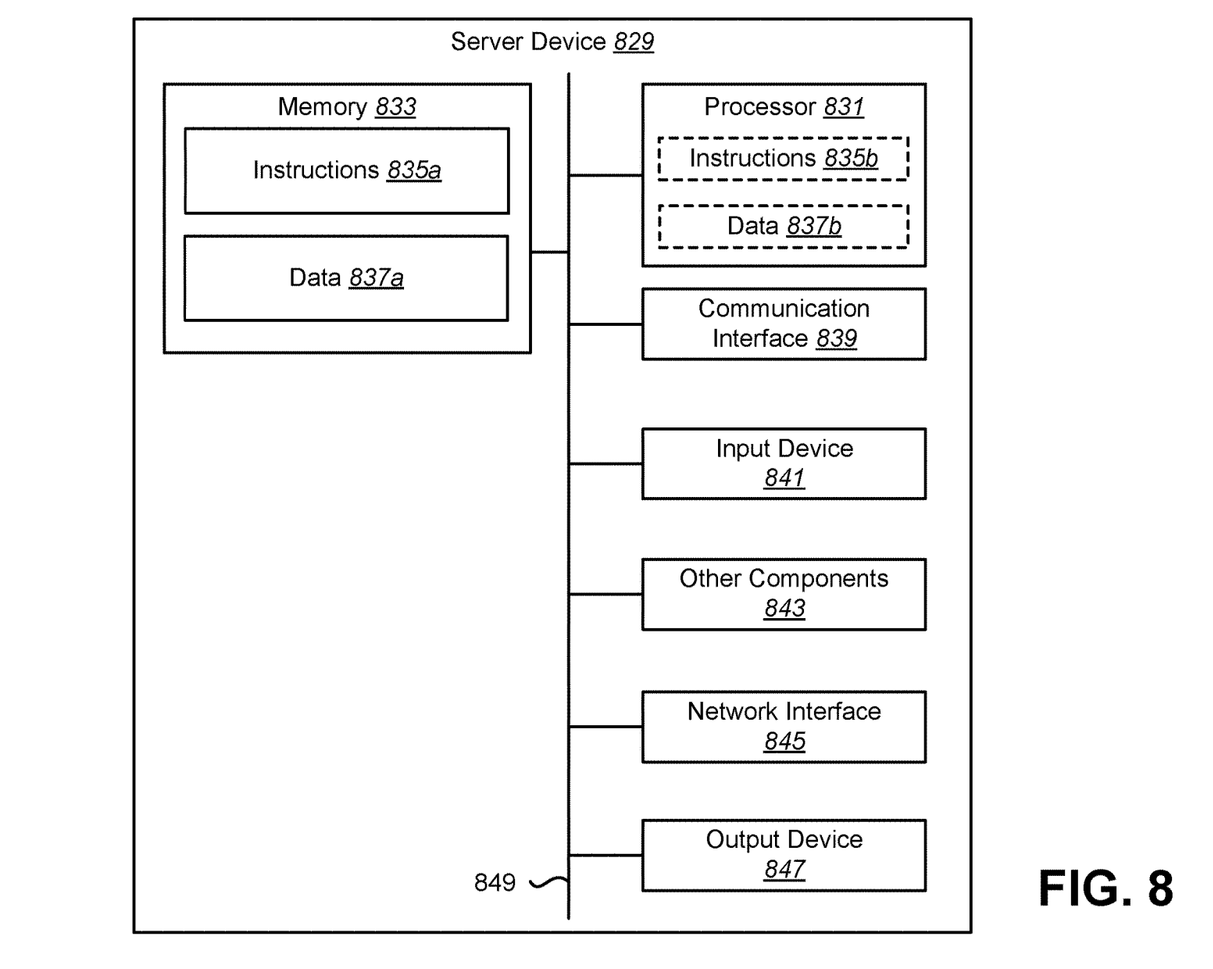
FIG. 8 is a block diagram illustrating various components that may be utilized in a server device.

FIG. 8 is a block diagram illustrating various components that may be utilized in a server device 829. The server device 829 may be an example of one or more of the server devices (e.g., server device 102, server device 302, etc.) described herein. Although one server device 829 is shown, some configurations herein may be implemented in a distributed system using multiple electronic devices. A server device 829 may include a broad range of digital computers, including microcontrollers, hand-held computers, personal computers, servers, mainframes, supercomputers, minicomputers, workstations and any variation or related device thereof.

The server device 829 is shown with a processor 831 and memory 833. The processor 831 may control the operation of the server device 829 and may be embodied as a microprocessor, a microcontroller, a digital signal processor (DSP) or other device known in the art. The processor 831 typically performs logical and arithmetic operations based on program instructions 835a and/or data 837a stored within the memory 833. The instructions 835a in the memory 833 may be executable to implement one or more of the functions, operations, and/or methods described herein. FIG. 8 illustrates instructions 835b and/or data 837b being loaded onto the processor 831. The instructions 835b and/or data 837b may be the instructions 835a and/or data 837a (or portions thereof) stored in memory 833.

The server device 829 may also include one or more communication interfaces 839 and/or network interfaces 845 for communicating with other electronic devices. The communication interface(s) 839 and the network interface(s) 845 may be based on wired communication technology and/or wireless communication technology, such as ZigBee®, WiMax®, WiFi®, Bluetooth® and/or cellular protocols, such as Global System for Mobile communications (GSM®), etc.

The server device 829 may also include one or more input devices 841 and one or more output devices 847. The input devices 841 and output devices 847 may facilitate user input/user output. Other components 843 may also be provided as part of the server device 829.

Instructions 835a and data 837a may be stored in the memory 833. The processor 831 may load and execute instructions 835b from the instructions 835a in memory 833 to implement various functions. Executing the instructions 835a may involve the use of the data 837a that is stored in the memory 833. The instructions 835b and/or data 837b may be loaded onto the processor 831. The instructions 835 are executable to implement the one or more methods shown herein and the data 837 may include one or more of the various pieces of data described herein.

The memory 833 may be any electronic component capable of storing electronic information. The memory 833 may be embodied as random access memory (RAM), read-only memory (ROM), magnetic disk storage media, optical storage media, flash memory devices in RAM, on-board memory included with the processor, EPROM memory, EEPROM memory, an ASIC (Application Specific Integrated Circuit), registers and so forth, including combinations thereof. The various components of the server device 829 may be coupled together by a bus system 849, which may include a power bus, a control signal bus and a status signal bus, in addition to a data bus. However, for the sake of clarity, the various buses are illustrated in FIG. 8 as the bus system 849.

Figure 9:
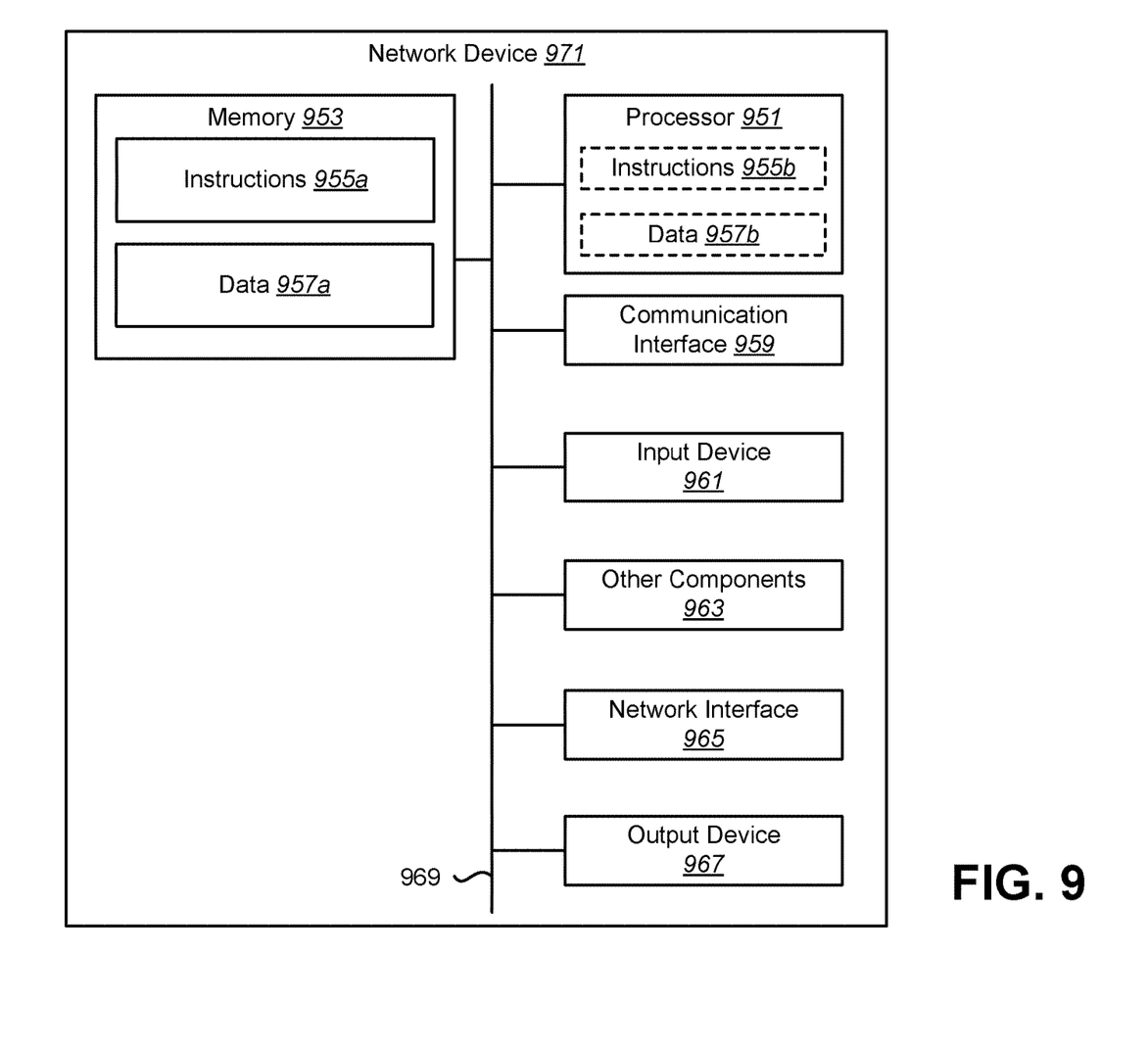
FIG. 9 is a block diagram illustrating various components that may be utilized in a network device.

FIG. 9 is a block diagram illustrating various components that may be utilized in a network device 971. The network device 971 may be an example of one or more of the network devices (e.g., network device 104, network device 304, etc.) described herein. Although one network device 971 is shown, some configurations herein may be implemented in a distributed system using multiple electronic devices. A network device 971 may include a range of electronic devices, including microcontrollers, hand-held computers, personal computers, servers, mainframes, supercomputers, minicomputers, workstations, routers, switches, firewalls, automation controllers, and any variation or related device thereof. In some configurations, the network device 971 may be an appliance. Additionally or alternatively, the network device 971 may be an embedded device inside an otherwise complete device (e.g., within an appliance).

The network device 971 is shown with a processor 951 and memory 953. The processor 951 may control the operation of the network device 971 and may be embodied as a microprocessor, a microcontroller, a digital signal processor (DSP) or other device known in the art. The processor 951 typically performs logical and arithmetic operations based on program instructions 955a and/or data 957a stored within the memory 953. The instructions 955a in the memory 953 may be executable to implement one or more of the functions, operations, and/or methods described herein. FIG. 9 illustrates instructions 955b and/or data 957b being loaded onto the processor 951. The instructions 955b and/or data 957b may be the instructions 955a and/or data 957a (or portions thereof) stored in memory 953.

The network device 971 may also include one or more communication interfaces 959 and/or network interfaces 965 for communicating with other electronic devices. The communication interface(s) 959 and the network interface(s) 965 may be based on wired communication technology and/or wireless communication technology, such as ZigBee®, WiMax®, WiFi®, Bluetooth® and/or cellular protocols, such as GSM®, etc.

The network device 971 may also include one or more input devices 961 and one or more output devices 967. The input devices 961 and output devices 967 may facilitate user input/user output. Other components 963 may also be provided as part of the network device 971.

Instructions 955a and data 957a may be stored in the memory 953. The processor 951 may load and execute instructions 955b from the instructions 955a in memory 953 to implement various functions. Executing the instructions 955a may involve the use of the data 957a that is stored in the memory 953. The instructions 955b and/or data 957b may be loaded onto the processor 951. The instructions 955 are executable to implement the one or more methods shown herein and the data 957 may include one or more of the various pieces of data described herein.

The memory 953 may be any electronic component capable of storing electronic information. The memory 953 may be embodied as random access memory (RAM), read-only memory (ROM), magnetic disk storage media, optical storage media, flash memory devices in RAM, on-board memory included with the processor, EPROM memory, EEPROM memory, an ASIC (Application Specific Integrated Circuit), registers and so forth, including combinations thereof. The various components of the network device 971 may be coupled together by a bus system 969, which may include a power bus, a control signal bus and a status signal bus, in addition to a data bus. However, for the sake of clarity, the various buses are illustrated in FIG. 9 as the bus system 969.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be tangible and non-transitory. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method, performed by a server device communicating via a secure transport layer network connection between: (i) a first network having at least a first connection for connecting any number of client devices to the server device, and (ii) a second network having at least a second connection for connecting any number of endpoint devices to a network device, the method comprising:
    receiving, by the server device from a first client device, a first message including information indicating a control request associated with an endpoint device;
    on condition that a persistently connected control channel (PCCCH) connects the server device to the network device, transmitting, by the server device to the network device via the PCCCH using a first frame type, a second message including information indicating command;
    receiving, by the server device from the network device via the PCCCH using the first frame type, a third message including status information associated with the endpoint device;
    transmitting, by the server device to the first client device, a fourth message including information indicating the status information;
    receiving, by the server device from a second client device via any of a secure socket layer (SSL) connection or a transport layer security (TLS) connection, a fifth message including tunneling information associated with a tunneling payload;
    transmitting, by the server device to the network device via the PCCH using a second frame type, a sixth message including the tunneling information;
    receiving, by the server device via the PCCCH using the second frame type, a seventh message including information associated with a response payload including framing information generated by the network device; and
    transmitting, by the server device to the second client device via any of the SSL connection or the TLS connection, an eighth message including information associated with the response payload.

2. The method of claim 1, wherein the first frame type is for communicating control information associated with the endpoint device, and
    wherein the second frame type is for communicating tunneling payload information associated with the tunnelling information is associated with a tunneling protocol.

3. The method of claim 2, wherein the first frame type is a TEXT frame type and the second frame type is a BINARY frame type.

4. The method of claim 1, wherein, on condition that that the PCCCH does not connect the server device to the network device, receiving, by the server device from the network device, WebSocket message including information indicating initiation of the PCCCH between the server device and the network device.

5. The method of claim 1, wherein the PCCCH is a WebSocket channel.

6. The method of claim 1, wherein the information indicating the command includes information commanding the network device to execute any of a function or an operation associated with the endpoint device.

7. The method of claim 1, wherein the status report includes information indicating any of: (a) whether the control request was fulfilled, and (b) a resulting state of the endpoint device.

8. The method of claim 1, wherein, the status indicator indicates any of: (a) whether the control request was fulfilled, and (b) the resulting state of the endpoint device.

9. The method of claim 1, further comprising determining the information indicating the control request associated with the endpoint device according to removing, by the server device, framing information from the first message, wherein the first message includes information indicating any of an open channel command and an open channel request.

10. The method of claim 1, wherein the server device includes any of a processor, a memory, and a communication interface, and
    wherein the server device is any of: a public-facing server device, a management server device, a proxy server device, and one of multiple server devices associated with a proxy server device.

11. The server device of claim 1, further configured to:
any of transmit and receive the first frame type for communicating control information associated with the endpoint device; and
any of transmit and receive the second frame type for communicating tunneling payload information associated with the tunnelling information is associated with a tunneling protocol.

12. The server device of claim 11, wherein the first frame type is a TEXT frame type and the second frame type is a BINARY frame type.

13. The server device of claim 1, wherein the status report includes information indicating any of: (a) whether the control request was fulfilled, and (b) a resulting state of the endpoint device.

14. The server device of claim 1, wherein, the status indicator indicates any of: (a) whether the control request was fulfilled, and (b) the resulting state of the endpoint device.

15. A server device including at least a processor, a communication interface, and memory, for communicating via a secure transport layer network connection between: (i) a first network having at least a first connection for connecting any number of client devices to the server device, and (ii) a second network having at least a second connection for connecting any number of endpoint devices to a network device, the server device configured to:
receive a first message from a first client device, the first message including information indicating a control request associated with an end point device;
on condition that a persistently connected control channel (PCCCH) connects the server device to the network device, transmit a second message to the network device via the PCCCH using a first frame type, the second message including information indicating a command;
receiving, by the server device from the network device via the PCCCH using the first frame type, a third message including status information associated with the endpoint device;
transmit a fourth message to the first client device, the fourth message including information indicating the status information;
receive a fifth message from a second client device via any of a secure socket layer (SSL) connection or a transport layer security (TLS) connection, the fifth message including tunneling information associated with a tunneling payload;
transmit a sixth message to the network device via the PCCH using a second frame type, the sixth message including the tunneling information;
receive a seventh message via the PCCCH using the second frame type, the seventh message including information associated with a response payload including framing information generated by the network device; and
transmit an eighth message to the second client device via any of the SSL connection or the TLS connection, the eighth message including information associated with the response payload.

16. The server device of claim 15, further configured to, on condition that that the PCCCH does not connect the server device to the network device, receive a WebSocket message from the network device, the WebSocket message including information indicating initiation of the PCCCH between the server device and the network device.

17. The server device of claim 15, wherein the PCCCH is a WebSocket channel.

18. The server device of claim 15, wherein the information indicating the command includes information commanding the network device to execute any of a function or an operation associated with the endpoint device.

19. The server device of claim 15, further configured to determine the information indicating the control request associated with the endpoint device according to removing framing information from the first message,
wherein the first message includes information indicating any of an open channel command and an open channel request.

20. The server device of claim 15, wherein the server device is any of: a public-facing server device, a management server device, a proxy server device, and one of multiple server devices associated with a proxy server device.

* * * * *

UNITED STATES PATENT AND TRADEMARK OFFICE
CERTIFICATE OF CORRECTION

PATENT NO. : 12,250,098 B2
APPLICATION NO. : 18/378635
DATED : March 11, 2025
INVENTOR(S) : James Loren Sparkman, III and Robert Joshua Walker Page 1 of 1

It is certified that error appears in the above-identified patent and that said Letters Patent is hereby corrected as shown below:

In the Claims

Claim 1, Column 19, Line 66 after "including information indicating" please ADD --"a"--

Signed and Sealed this
Second Day of September, 2025

Coke Morgan Stewart
*Acting Director of the United States Patent and Trademark Office*